(12) United States Patent
Carpenter

(10) Patent No.: US 8,032,974 B2
(45) Date of Patent: Oct. 11, 2011

(54) GRILL CLEANING APPARATUS

(75) Inventor: Bradford R. Carpenter, White Bear Lake, MN (US)

(73) Assignee: Bradford R. Carpenter, White Bear Lake, MN (US)

( * ) Notice: Subject to any disclaimer, the term of this patent is extended or adjusted under 35 U.S.C. 154(b) by 1011 days.

(21) Appl. No.: 11/833,824

(22) Filed: Aug. 3, 2007

(65) Prior Publication Data

US 2009/0031519 A1    Feb. 5, 2009

(51) Int. Cl.
*A47L 13/08*    (2006.01)

(52) U.S. Cl. .................. 15/229.11; 15/229.13; 29/428

(58) Field of Classification Search .............. 15/229.11, 15/229.13, 236.01, 104.001, 111, 229.12, 15/244.1; 29/428, 592
See application file for complete search history.

(56) References Cited

U.S. PATENT DOCUMENTS

| | | | |
|---|---|---|---|
| 2,747,911 A | 5/1956 | Kuever | |
| 2,824,323 A | 2/1958 | Tos et al. | |
| 3,085,372 A | 4/1963 | Sweeney et al. | |
| 3,307,212 A | 3/1967 | MacInnes | |
| 3,487,491 A | 1/1970 | Dunn | |
| 3,800,354 A | 4/1974 | Stephens | |
| 3,820,185 A | 6/1974 | Phillips | |
| D234,743 S | 4/1975 | Andersen | |
| D242,687 S | 12/1976 | Broberg, Jr. | |
| 4,146,943 A | 4/1979 | Wertheimer et al. | |
| D254,953 S | 5/1980 | Delamater | |
| 4,286,349 A | 9/1981 | Dugrenier | |
| D264,543 S | 5/1982 | Ashley | |
| D267,281 S | 12/1982 | Mottl et al. | |
| 4,365,380 A | 12/1982 | Fassler | |
| 4,372,788 A | 2/1983 | Lancz | |
| D304,892 S | 12/1989 | Bevilacqua | |
| D321,962 S | 11/1991 | Roma et al. | |
| 5,373,600 A | 12/1994 | Stojanovski et al. | |
| D358,491 S | 5/1995 | Hoagland | |
| D398,110 S | 9/1998 | Zemel | |
| D400,328 S | 10/1998 | Zemel | |
| 6,023,810 A * | 2/2000 | Gessert | 15/229.13 |
| 6,125,493 A | 10/2000 | Daw | |
| 6,192,545 B1 * | 2/2001 | Gessert | 15/229.13 |
| 6,216,306 B1 | 4/2001 | Esterson et al. | |
| 6,594,852 B1 | 7/2003 | Schedlinski et al. | |
| 6,966,094 B1 | 11/2005 | Rigakos | |
| D520,312 S | 5/2006 | Roma et al. | |
| 7,039,983 B1 | 5/2006 | Outlaw | |
| 7,047,590 B2 | 5/2006 | Neal et al. | |
| 2005/0178405 A1 * | 8/2005 | Coulthard, Jr. | 134/6 |
| 2006/0207042 A1 * | 9/2006 | Di Paolo | 15/111 |

OTHER PUBLICATIONS

Cooks' Illustrated, Jul. and Aug. 2007.
International Search Report and Written Opinion in International Application No. PCT/US08/09377 dated Nov. 6, 2008.

* cited by examiner

*Primary Examiner* — Shay Karls

(57) ABSTRACT

A handle assembly includes a handle having a front end and a back end and a receptacle mounted to the front end, wherein the receptacle defines a recess. A projection extends into the recess and a removable fastener also extends into the recess. The projection and the removable fastener are adapted to be inserted into an abrasive member to retain the abrasive member in the recess.

5 Claims, 6 Drawing Sheets

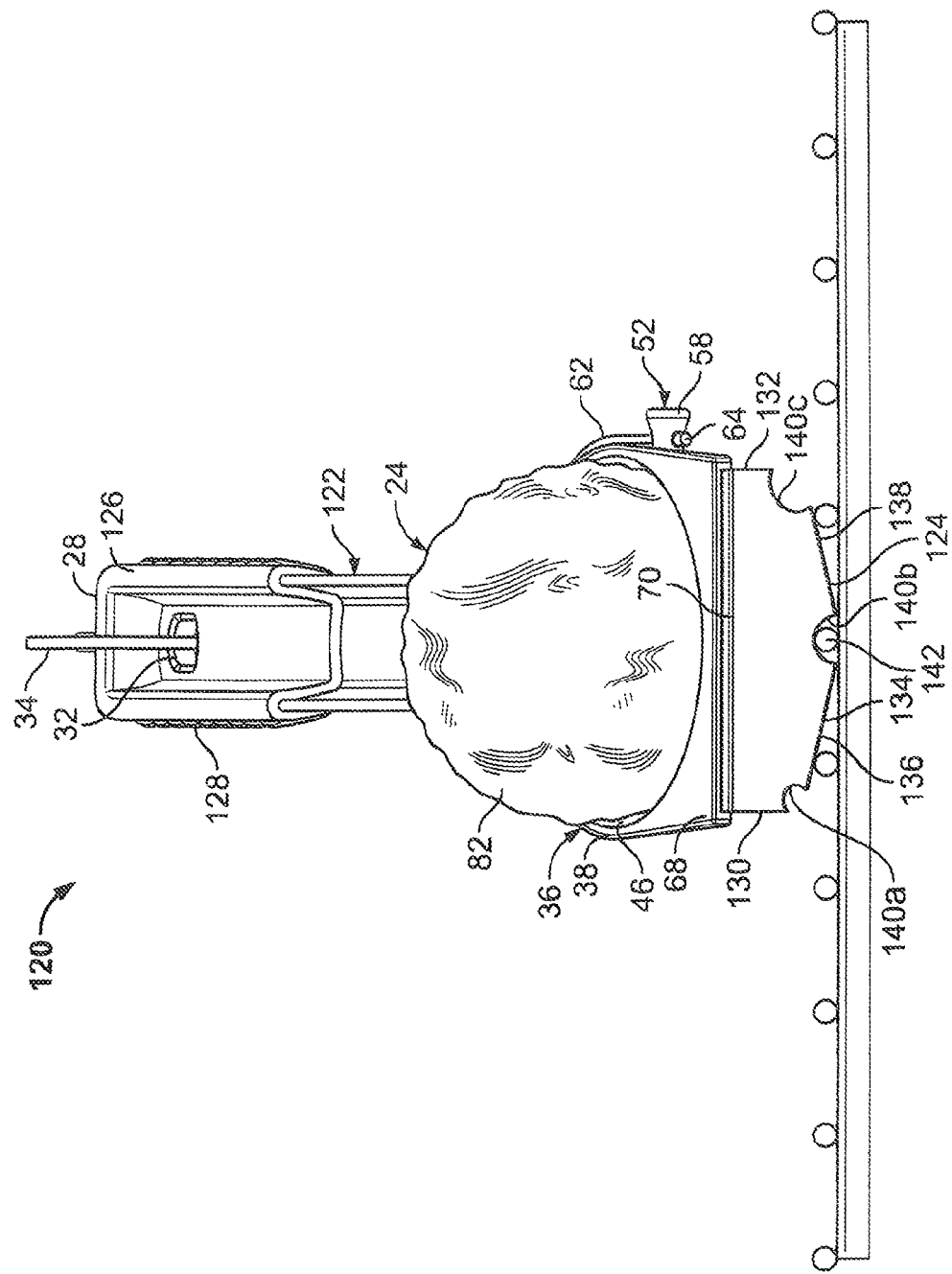

GRILL CLEANING APPARATUS

CROSS REFERENCE TO RELATED APPLICATIONS

Not applicable.

REFERENCE REGARDING FEDERALLY SPONSORED RESEARCH OR DEVELOPMENT

Not applicable.

SEQUENTIAL LISTING

Not applicable.

BACKGROUND OF THE INVENTION

1. Technical Field

The present invention is directed toward a grill cleaning apparatus, and more particularly, a grill tool with a replaceable abrasive member.

2. Background Art

Grill brushes and scrapers are generally known in the art and are used to clean a grill surface that has become coated with soot, charred foodstuff, and other debris. Specifically, a grill grate, rack, or grid is in constant need of cleaning as food is cooked on the grill. Prior grill cleaning apparatus include wire bristles and metal blades used to remove debris from the grill surface. However, such prior apparatus quickly accumulate debris and become unsanitary during the cleaning process. In addition, such apparatus are difficult to clean and wear down upon repeated use.

Other grill cleaning apparatus utilize a removable brush or cleaning pad that can be cleaned or discarded and replaced with a special replacement brush or pad. Such apparatus that utilize a removable brush include bristles that are attached to a support structure, which is secured to a handle by screws or split-snaps. Prior apparatus that utilize a removable cleaning pad attach the cleaning pad to a handle via clamps that secure side portions of the cleaning pad. Such removable brushes and pads are specially manufactured, relatively expensive, an,d are generally not recyclable. Further, replacement brushes or pads often are not readily available, but are often available only at specialty stores or through catalogs.

An alternative grill cleaning apparatus comprises a crumpled sheet of aluminum foil wrapped around a napkin coated with oil. The crumpled aluminum foil and napkin is held by tongs and used to brush a grill surface. In addition, holes are poked through the aluminum foil to allow the oil to seep out and season the grill. Alternatively, a rolled up towel or napkin coated with oil is held by tongs and used to season the grill. Generally, tongs are an unwieldy means of securing a cleaning member such as a crumpled sheet of aluminum foil or a rolled up towel, because a user must apply sufficient hand pressure to securely retain the cleaning member and a back and forth force to clean the grill surface. Further, the tongs do not provide a satisfactory scraper blade.

SUMMARY OF THE INVENTION

In one embodiment, a handle assembly includes a handle having a front end and a back end and a receptacle mounted to the front end, wherein the receptacle defines a recess. A projection extends into the recess and a removable fastener also extends into the recess. The projection and the removable fastener are adapted to be inserted into an abrasive member to retain the abrasive member in the recess.

In another embodiment, a grill cleaning device includes a handle portion that has a receiving portion disposed at a front end thereof, wherein the receiving portion defines a recess. A protrusion extends into the recess and a removable pin also extends into the recess. The grill cleaning device also includes a scrubbing element received in the receiving portion, wherein the protrusion and the removable pin extend into the scrubbing element to removeably retain the scrubbing element in the receiving portion.

In yet another embodiment, a method of providing a grill tool includes the steps of providing a handle that includes a recessed portion wherein the recessed portion is adapted to receive a cleaning element, and providing instructions to form the cleaning element from a malleable, heat resistant material.

BRIEF DESCRIPTION OF THE DRAWINGS

Other aspects and advantages of the present invention will become apparent upon reading the following detailed description and upon reference to the drawings in which:

FIG. 9 is a front elevational view of the grill cleaning device of FIG. 7 in a third condition.

DETAILED DESCRIPTION

Figure 1:
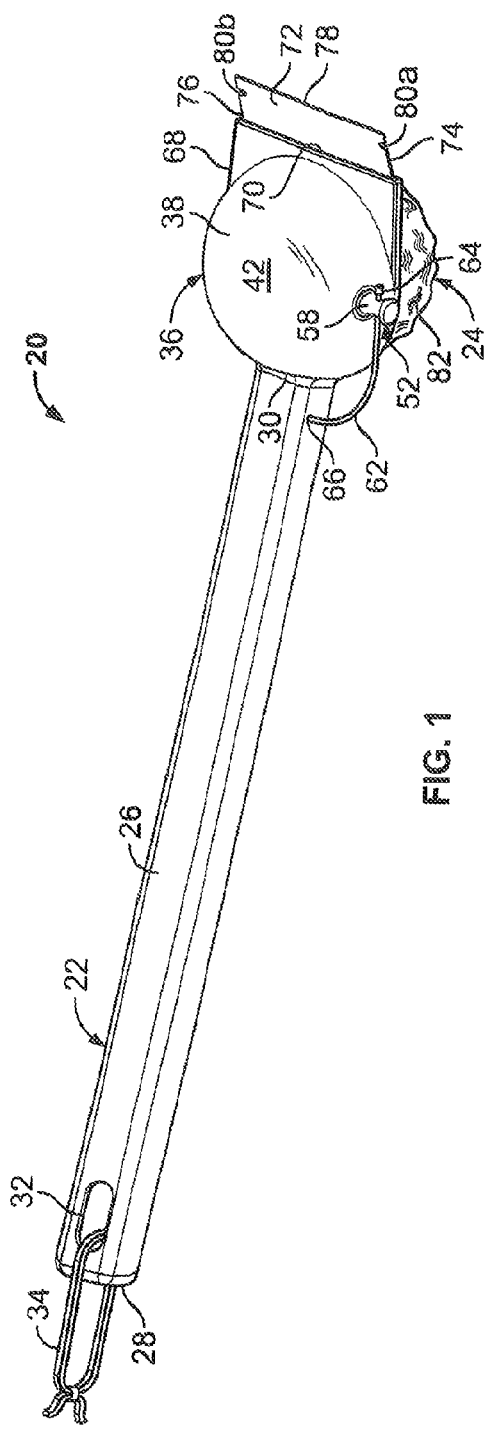
FIG. 1 is an isometric view of a grill cleaning device according to an embodiment.

In FIG. 1, a grill cleaning device or tool 20 includes a handle portion or assembly 22 and an abrasive member 24. The handle assembly 22 includes an elongate handle or grip portion 26 having a back end 28 and a front end 30. A notch or eye 32 formed through the handle 26 proximate the back end 28 allows the handle assembly 22 to hang from a support structure (not shown). In addition, an optional strap 34 of leather or other material can be threaded through the notch 32 to provide a loop to hang the handle assembly 22 when not in use. A receptacle 36 adapted to receive and retain the abrasive member 24 is mounted to the front end 30 of the handle 22. Referring to FIGS. 1-4, the receptacle 36 is a truncated ellipsoid or dome shape that includes a continuous side wall 38 having an interior side 40 and an exterior side 42. The interior side 40 of the side wall 38 defines a recess 44 having an opening 46 that is adapted to receive the abrasive member. In the present embodiment, the handle 26 extends upwardly from the receptacle 36 at about a 12° angle with respect to the opening 46. In other embodiments, the handle extends upwardly at about a 10° to about a 15° angle with respect to the opening 46. However, the handle 26 and the receptacle 36 can extend at any angle with respect to each other, including an angle of about 0°.

Figure 2:
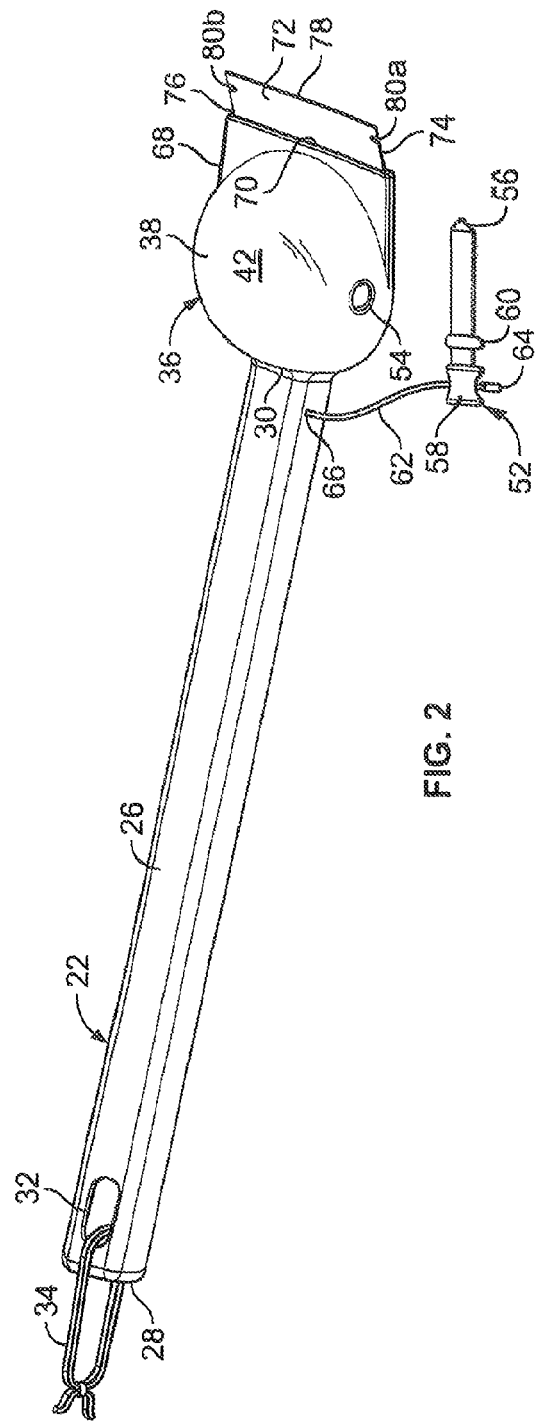
FIG. 2 is a top isometric view of the grill cleaning device of FIG. 1 without a brushing member.
Figure 3:
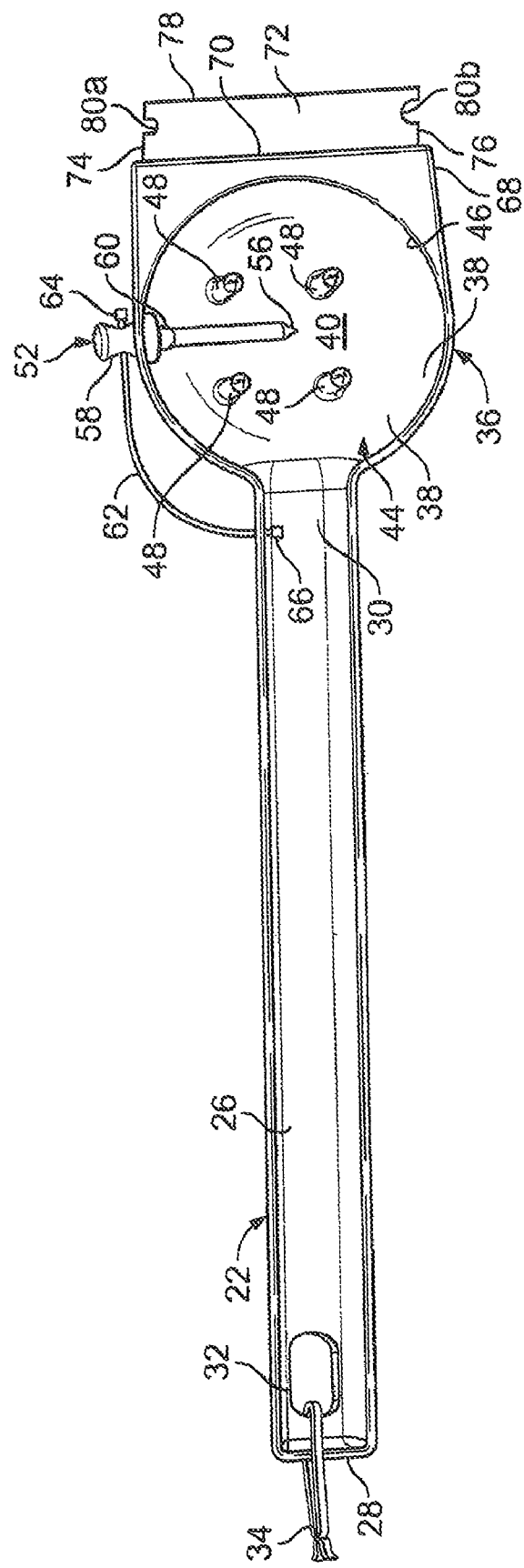
FIG. 3 is a bottom isometric view of the grill cleaning device of FIG. 2.
Figure 4:
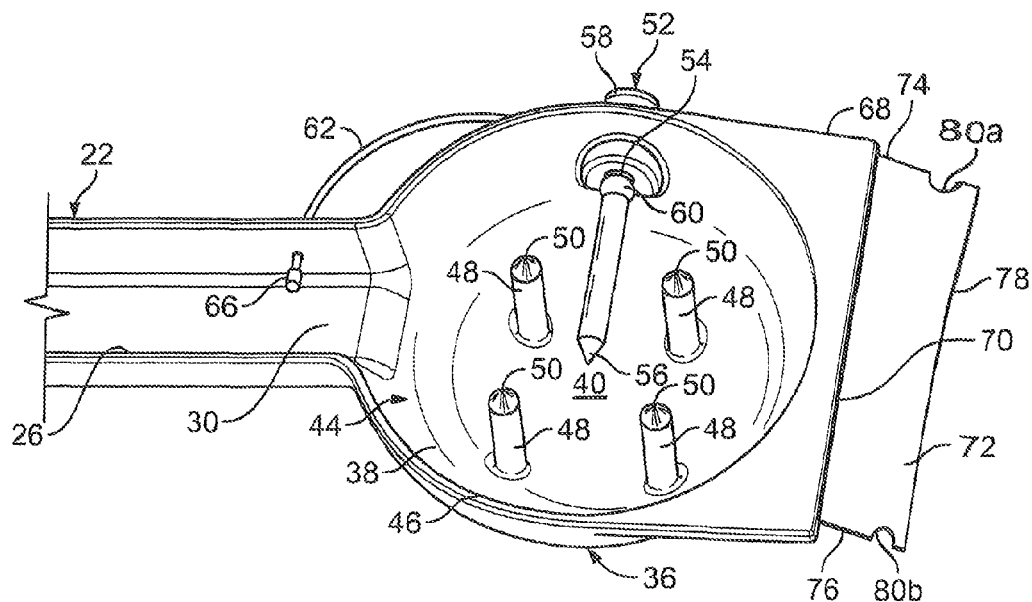
FIG. 4 is an enlarged partial isometric view of the grill cleaning device of FIG. 3.

In FIGS. 3 and 4, a plurality of projections or protrusions extend from the interior side 40 of the side wall 38 into the recess 44. As seen in more detail in FIGS. 4 and 5, the projections are elongate pins 48 that have a pointed tip 50. The pins 48 extend from the side wall 38 downwardly toward the opening 46 and the pointed tip 50 of each pin terminates at a point before the opening. In the present embodiment, four pins 48 are arranged in a square pattern and the pins extend substantially parallel to each other. The receptacle 36 also includes a fastener 52 that extends through a hole 54 in the side wall 38 and into the recess 44. The fastener 52 is an elongate pin having a pointed tip 56 that extends angularly with respect to the pins 48 and can be removed from the hole 54 (as seen in FIG. 2). In FIGS. 3 and 4, the fastener 52 extends substantially perpendicularly with respect to the pins 48. In addition, the fastener 52 includes a grip portion 58 distal from the pointed tip 56 and an annular ring 60 spaced from the grip portion. A connector 62 is provided to secure the fastener 52 to the handle 26. In the present embodiment, the connector 62 is a metal wire or other flexible, heat-resistant material that has a first end 64 coupled to the fastener 52 at the grip portion 58 and a second end 66 coupled to the handle 26 proximate the front end 30.

A front extension 68 of the receptacle 36 terminates in a substantially rectangular end 70 that supports a scraper blade 72. In the present embodiment, the blade 72 extends angularly away from the receptacle 36 at about a 30° angle with respect to the opening 46. In other embodiments, the blade 72 extends away from the receptacle 36 at about a 15° to about a 45° angle with respect to the opening 46. However, the blade 72 and the receptacle 36 can extend at any angle with respect to each other, including an angle of about 0°. The blade 72 includes first and second side edges 74, 76, respectively, and a front edge 78. Further, each side edge 74, 76 includes a curved notch 80. In the present embodiment, a first curved notch 80a is disposed in the first side edge 74 and is generally the same shape as a second curved notch 80b disposed in the second side edge 74. The first curved notch 80a is slightly smaller than the second curved notch 80b to accommodate round grill grates of different diameters.

In different embodiments, the handle 26 is between about 8 to about 20 inches in length and the receptacle 36 is about 2 to about 4 inches in length. Further, the scraper blade 72 is about 0.5 to about 2 inches in length. In addition, the pins 48 and the removable fastener 52 have similar, but not necessarily identical, dimensions of about 0.1 to about 0.4 inches in width and about 0.75 to about 2 inches in length. In one example, the handle 26 is about 12 inches in length, the receptacle 36 is about 3.2 inches in length, the scraper blade 52 is about 1 inch in length, the pins 48 are about 0.2 inches in width and about 1.15 inches in length, and the fastener is about 0.18 inches in width and about 1.4 inches in length.

Figure 5:
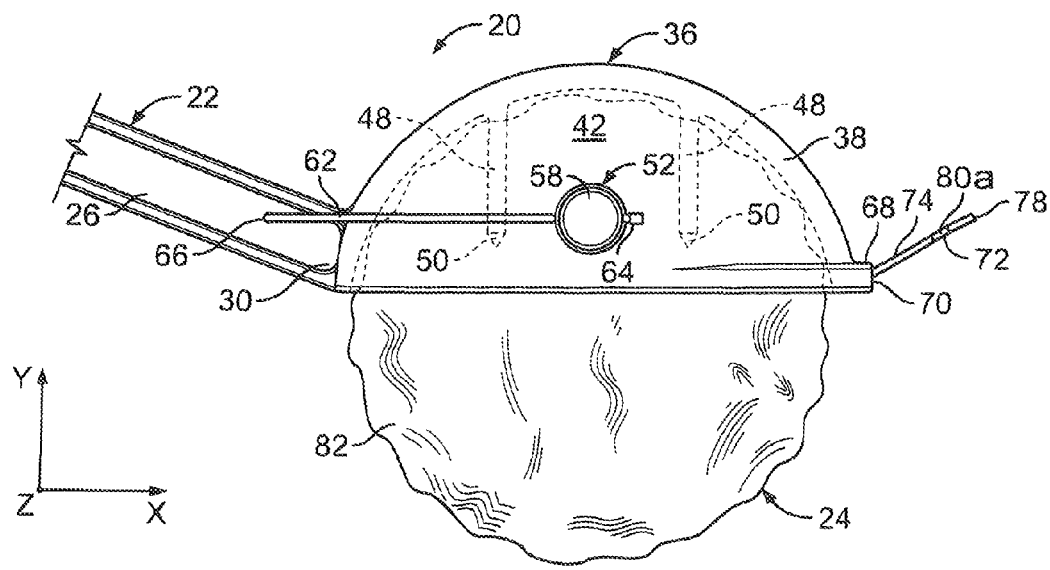
FIG. 5 is a partial side elevational view of the grill cleaning device of FIG. 1.
Figure 6:
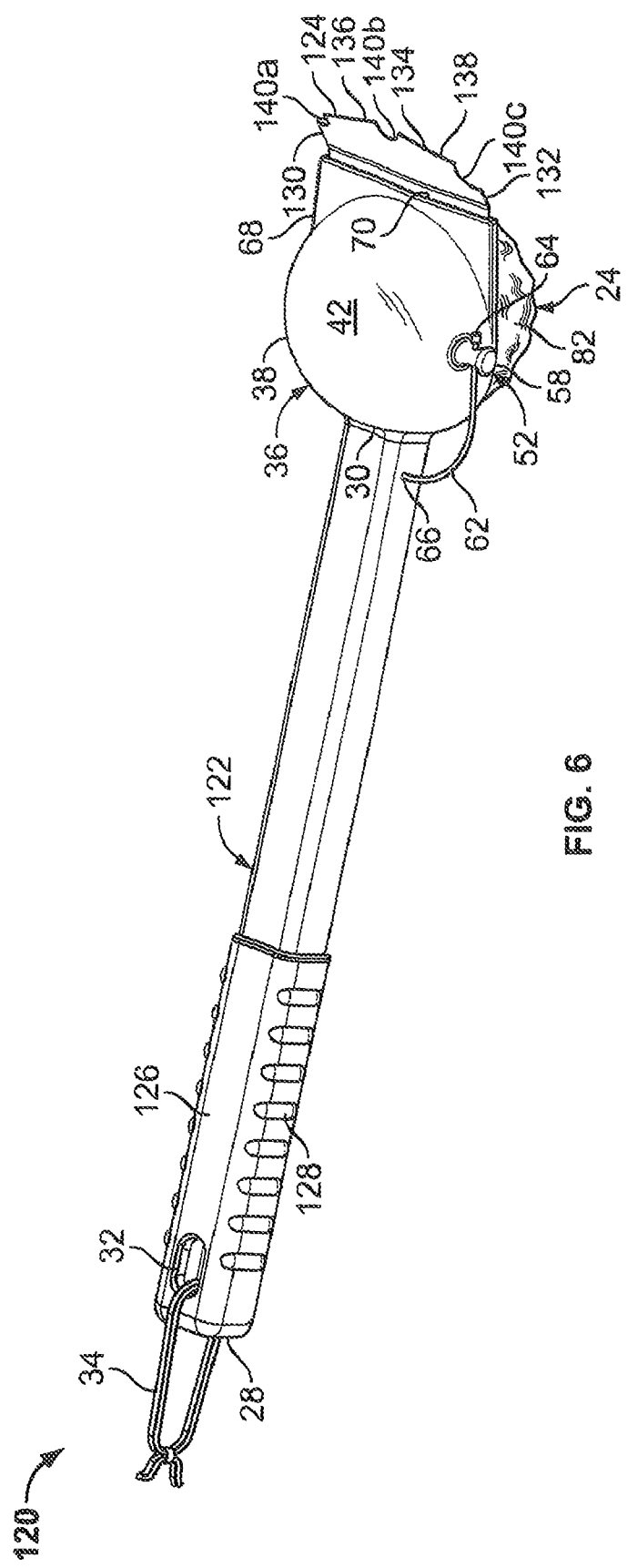
FIG. 6 is a top isometric view a grill cleaning device according to another embodiment.

The handle assembly 22 is adapted for use with a sphere or round shape scrubbing element or abrasive member 24 (as seen in FIGS. 1 and 5). Specifically, the sphere or round shape abrasive member 24 is received in the recess 44 of the receptacle 36 and is retained by the pins 48 and the fastener 52. In use, the abrasive member 24 is inserted into the receptacle 36 so that the pins 48 extend into the abrasive member. Thereafter, the fastener 52 is inserted through the hole 54 and into the abrasive member 24 to retain the abrasive member in the receptacle 36. The use of the pin assures that the abrasive member remains safely and securely engaged in the receptacle during the entire grill cleaning process. The abrasive member 24 is removed from the receptacle by reversing the above steps.

While the abrasive member 24 is retained in the receptacle, the pins 48 extend into the abrasive member 24 along a first axis and the fastener 52 extends into the abrasive member along a second axis angled from the first axis. Referring to FIG. 5, the first axis is substantially parallel to a y-axis and the second axis is substantially parallel to a z-axis orthogonal to the y-axis. In this configuration, the abrasive member 24 is securely retained in the recess 44 about two divergent axes of rotation. Thus, the abrasive member 24 is held within the recess 44 and prevented from rotating within the recess to provide a stable abrasive surface to clean a grill.

In one embodiment, the abrasive member 24 is an ad hoc or improvised element that can be formed from a malleable material such as aluminum foil. In particular, the abrasive member 24 can be hand-formed or fashioned by a user from a sheet of aluminum foil into a ball or other suitable shape to fit into the recess. In one example, the abrasive member is a sheet of aluminum foil about 12 inches (about 30 centimeters) in width and in length that is formed into a compact mass 82. In another example, the sheet of aluminum foil is about 18 inches (about 46 centimeters) in width and in length. Referring to FIG. 5, the mass 82 is formed into a ball that is inserted into the recess 44 such that the pins 48 and the fastener 52 pierce and extend into the mass 82 thereby securely retaining the mass 82 in the receptacle 36.

It advantageous to use a malleable, heat-resistant material, such as aluminum foil to form the spherical or round shape abrasive member 24, because such materials can be hand-formed into a compact mass and are suitable for cleaning applications that involve high temperatures. The spherical or round shape abrasive member is shaped as such to allow the highest degree of pressure to be applied to optimize the grill cleaning process. In addition, the handle assembly 22 is particularly suited for use with such materials, because the 48 pins and the fastener 52 can be easily inserted into the malleable material to secure the spherical or round shaped abrasive member in the recess 44. In addition, aluminum foil is commonly found in most households and is readily available in many stores. Further, aluminum foil is recyclable, which further distinguishes the embodiments described herein from other grill cleaning tools. These and other advantages will be readily apparent to one skilled in the art upon reading the present disclosure.

FIGS. 6-9 illustrate another embodiment of a grill cleaning apparatus 120 similar to the grill cleaning apparatus 20 described above that includes a modified handle 122 and scraper blade 124. The handle 122 includes a molded rubber portion 126 proximate the back end 28 of the handle 122 that extends along the handle 122 toward the front end 30. The molded rubber portion 126 includes a plurality of ridges 128 that provide a stable grip for a user. The blade 124 extends straight out from the rectangular end 70 of the front extension 68 for a short distance before extending angularly away from the receptacle 36 at about a 30° angle with respect to the opening 46. In addition, the blade 124 includes first and second side edges 130, 132, respectively, and a front edge 134. The front edge 134 further includes first and second angled planes 136, 138, respectively. In addition, the blade 124 includes a plurality of notches 140. A first notch 140a is disposed between the first side edge 130 and the first angled plane 136, a second notch 140b is disposed between the first and second angled planes 136, 138, respectively, an-id a third notch 140c is disposed between the second side edge 132 and the second angled plane 138. The notches 140 have different dimensions to accommodate the various shapes and sizes of grill grates. For example, the notches 140 can be triangular, rectangular, or arcuate cut-out portions of different sizes.

Figure 7:
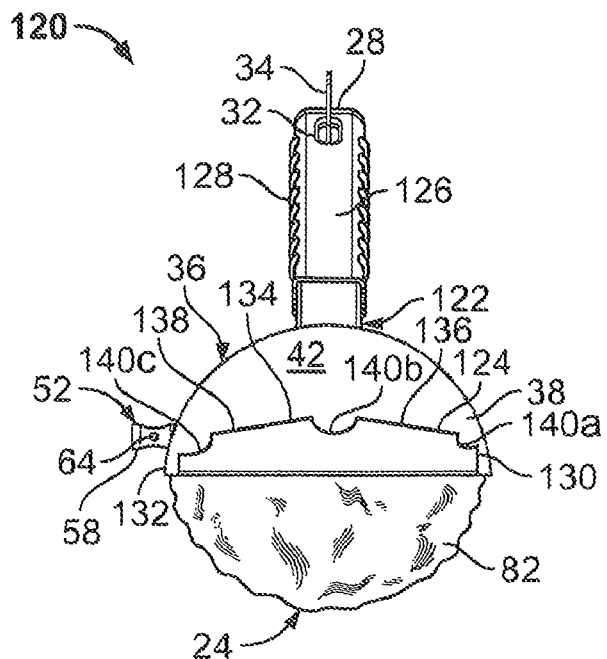
FIG. 7 is a front elevational view of the grill cleaning device of FIG. 6 that includes a brushing member in a first condition.
Figure 8:
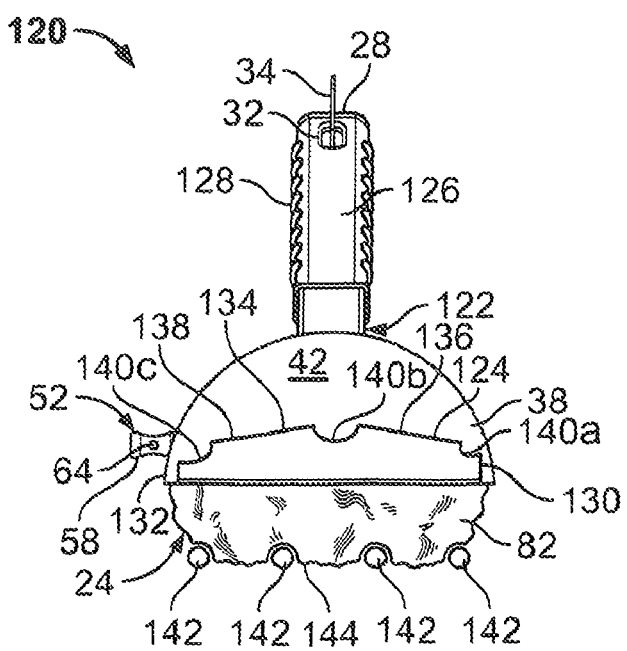
FIG. 8 is a front elevational view of the grill cleaning device of FIG. 7 in a second condition.

As seen in FIG. 7, the abrasive member 24 is received and retained in the recess 44 in a first condition prior to use. During use, a user presses the abrasive member 24 against a grill grate or surface 142 to be cleaned and moves the abrasive member in a back and forth motion to brush or scrape debris from the surface. Referring to FIG. 8, the pressure of the abrasive member 24 against the surface 142 causes the abrasive member to deform and compact into a second condition. Specifically, if the abrasive member 24 is a malleable material, such as aluminum foil, then the abrasive member will deform into a ridged surface 144 that conforms to the shape of the grill grate 142. Consequently, the abrasive member 24 cleans a greater surface area of the surface 142 with each back and forth stroke. The angled orientation of the handle 26 with respect to the receptacle 36 allows a user to clean a hot surface 142 while keeping the user's hands away from the surface. After the abrasive member 24 has been used to clean the grill surface 142, the abrasive member can be easily removed and discarded or recycled by removing the fastener 52 from the hole 54. Typically, the used abrasive member 24 in the second condition will be compacted so that the abrasive member 24 will fall out of the receptacle 36 after the fastener 52 is removed. Otherwise, the abrasive member 24 can be easily knocked out into a waste basket or recycling bin. Referring now to FIG. 10, in a third condition, the grill cleaning apparatus 120 is flipped over and the blade 124 pressed against the surface 142 and moved in a back and forth motion to clean the grill. In the third condition, any of the notches 140 and side or front edges 120-134 can be employed to scrape debris from the surface 142.

In different embodiments, the handle assembly 22, 122 is made of a high temperature resistant molded plastic and the blade 72, 124 is stamped stainless steel. Additionally, the molded rubber portion 126 can be incorporated with the handle assembly 22, 122 with or without the ridges 126. Alternatively, the molded rubber portion 126 may be omitted and the handle assembly 22, 122 itself can be provided with ridges 128. In further embodiments, the receptacle 36 can take on other shapes, e.g., a cube, a pyramid, a cone, an annular ring, or any other symmetrical or nonsymmetrical shape. Further, the receptacle 36 need not include a continuous side wall 38 but can be provided with gaps or openings in the side wall. It is also envisioned that one or more pins 48 of different shapes and sizes can be arranged in any pattern and also that the pin(s) can extend in any direction with respect to each other or with respect to the receptacle 36. Illustratively, a single pin 48 can extend from the receptacle 36 into the recess 44 to retain the abrasive member 24. In another embodiment, the pins 48 are also removable or are omitted. Alternatively or in conjunction, additional removable fasteners 52 are included to secure the abrasive member 24 in the receptacle 36. In yet another embodiment, the combination of one or more pins 48 or fasteners 52 secures a single axis of the abrasive material 24, which is allowed to rotate or spin within the recess 44.

In still other embodiments, the abrasive member 24 can be made of any suitable heat-resistant material such as steel or silicon carbide. In one embodiment, the material has a melting point above about 650° Fahrenheit (about 340° Centigrade) to clean a hot grill, e.g., during the cooking process. However, materials with lower melting points can also be used. In addition, the abrasive member 24 can be any shape that is adapted to fit at least partially inside the recess 44 and retained by the pins 48 and/or fastener 52. Other types of metal scrubbers or scouring pads can also be used with the handle assembly 22, 122 to form the grill cleaning device or tool 20, 120.

One of ordinary skill in the art will recognize that the handle assembly 22, 122 can be provided to a user without the abrasive member 24. The user can hand-form the abrasive member 24 from any available material and secure the abrasive member 24 in the receptacle 36 with the pins 48 and the fastener 52 to form the grill cleaning device 20, 120. In addition, the handle assembly 22 can be provided with instructions to form the abrasive member 24 from readily available household materials. The instructions can include written steps or illustrations that are provided on or with the handle assembly 20, 120. For example, the instructions to form the grill cleaning device 20, 120 can include, without limitation, the following steps: crumpling a sheet of aluminum foil into a fist-sized ball, inserting the aluminum foil into the recess 44, and inserting the fastener 52 through the hole 54 and into the aluminum foil. In this manner, the handle assembly 22, 122 functions as a grill cleaning tool 20, 120 adapted for use with an easily replaceable abrasive member 24 that does not require the user to purchase a special replacement.

In another embodiment, any of the handle assemblies 22, 122 disclosed herein can be provided to a user with one or more preformed abrasive members 24 to forth a grill cleaning tool ready for immediate use.

Those skilled in the art will appreciate the numerous variations that may be made with respect to the present disclosure and which are intended to be captured by the present disclosure. For example, any of the embodiments described herein may be modified to include any of the structures or methodologies disclosed in connection with different embodiments.

INDUSTRIAL APPLICABILITY

The grill cleaning device described herein advantageously provides a handle assembly that is adapted for to securely retain an ad hoc or improvised abrasive member. The abrasive member can be hand-formed by a user from any suitable material. In one example, the abrasive member is a sheet of aluminum foil formed into a mass. Thus, an inexpensive and readily available abrasive member, which is also easily removed from the handle assembly and replaced, is provided.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out the same. The exclusive right to all modifications within the scope of the appended claims is reserved.

I claim:
1. A grill cleaning device comprising:
a handle having a front end and back end;
a dome shaped receptacle mounted to the front end, wherein the receptacle defines
  a continuous side wall having an interior side and an exterior side, with a dome shaped recess located on the interior side;
a plurality of protrusions extending from the interior side into the recess;
a hole between the exterior and interior side of the receptacle;
a removable fastener including a grip end and a pin end, wherein
  the grip end is attached to a connector securing the fastener to the handle, the pin end extending through the hole from the exterior side of the side wall into the recess; and a scrubbing member received in the dome shaped recess; wherein the projections and the removable fastener are adapted to be inserted into the scrubbing member to retain the scrubbing member in the recess.

2. The grill cleaning device of claim 1, wherein the scrubbing element is a hand-formed element made of a heat-resistant material formed into a spherical or round shape.

3. The grill cleaning device of claim 2, wherein the scrubbing element is made from a mass of aluminum foil.

4. The grill cleaning device of claim 1, wherein the protrusions secure a first axis of rotation of the scrubbing element and the removable fastener is adapted to secure a second axis of rotation of the scrubbing member.

5. The grill cleaning device of claim 4, wherein the first axis of rotation is angularly divergent from the second axis of rotation.

* * * * *